United States Patent
Shapiro

[19]

[11] Patent Number: 5,897,412
[45] Date of Patent: Apr. 27, 1999

[54] SHOE REPAIR COMPOSITE MATERIAL

[76] Inventor: Charles Shapiro, 17210 Newhope St., #1312, Fountain Valley, Calif. 92708

[21] Appl. No.: 08/974,006

[22] Filed: Nov. 19, 1997

[51] Int. Cl.⁶ ........................................................ B32B 7/02
[52] U.S. Cl. .............................. 442/66; 442/65; 442/151; 442/394; 442/398; 447/149; 428/63; 428/109; 428/220; 428/911
[58] Field of Search .............................. 428/63, 109, 220, 428/911; 442/65, 66, 151, 394, 398, 149

[56] References Cited

U.S. PATENT DOCUMENTS

| | | | |
|---|---|---|---|
| 3,354,562 | 11/1967 | Munari | 36/2.5 |
| 3,553,857 | 1/1971 | Pettit | 36/32 |
| 3,733,721 | 5/1973 | Clemens | 36/32 |
| 4,317,294 | 3/1982 | Goodyear | 36/100 |
| 4,608,768 | 9/1986 | Cavanagh | 36/28 |

*Primary Examiner*—Richard Weisberger
*Attorney, Agent, or Firm*—Gene Scott-Patent Law & Venture Group; Eric Karich, Esq.

[57] ABSTRACT

The present invention provides a shoe repair composite material having a cloth layer bonded to the bottom of a shoe with a bonding adhesive layer. The cloth layer has a thickness of approximately 0.020 inches and is impregnated with a contact cement sold under the trademark DAP WELD-WOOD™. The bonding adhesive layer is made of double sided specialty coated tape sold under the trademark TESAFIX™, type 4964 Textile Fixing and Splicing Tape, having a thickness of approximately 0.020 inches. These two layers are bonded together and then covered with peel-removable paper to protect the contact cement and the bonding adhesive. In an alternative embodiment, the cloth layer is covered with a vinyl layer having a thickness of approximately 0.020 inches to provide a tough, inelastic and scuff-resistant outer layer. This vinyl layer provides a plurality of approximately 700 embossed protrusions per square inch to provide scuff-resistance and increased traction.

7 Claims, 2 Drawing Sheets

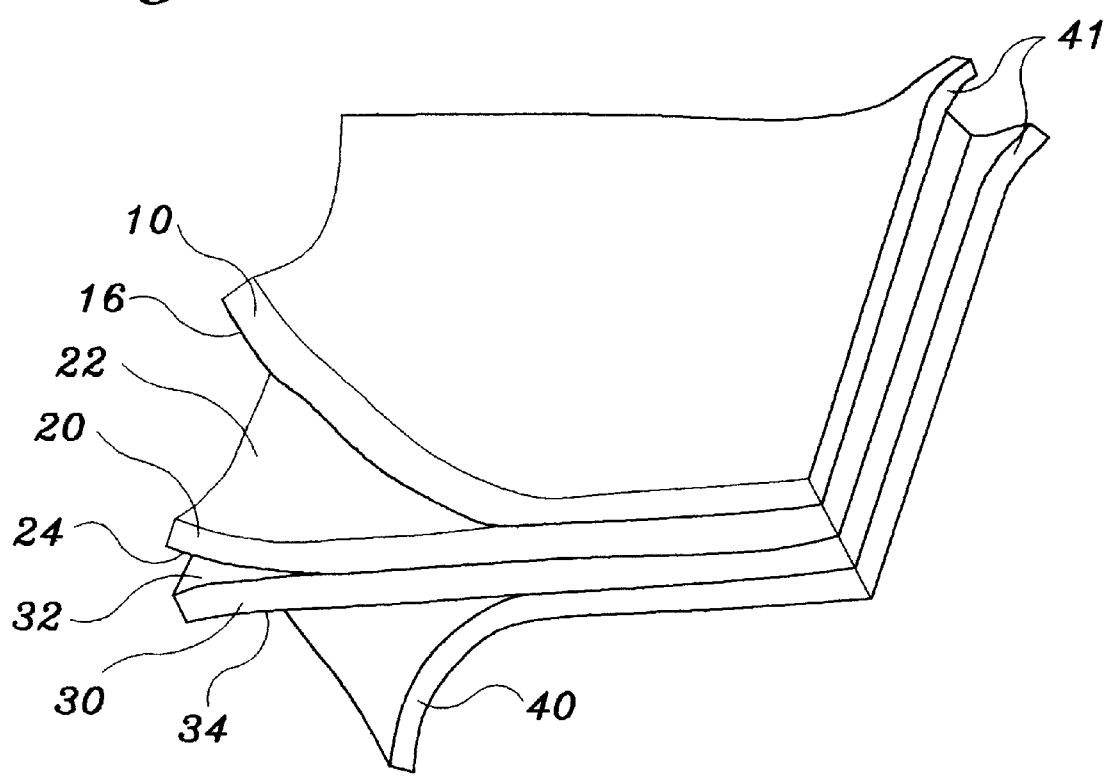

SHOE REPAIR COMPOSITE MATERIAL

BACKGROUND OF THE INVENTION

1. Field of the Invention

This invention relates generally to a material for repairing the bottom surfaces of shoes, and more particularly to a shoe repair composite material which is bonded to the bottom surfaces of shoes with a contact bonding adhesive.

2. Description of Related Art

The following art defines the present state of this field:

Pettit, et al., U.S. Pat. No. 3,553,857 describes a sole unit of elastomeric soling material other than thermoplastic rubber and carrying a dried film of a solvent-based polyurethane or polychloroprene adhesive superimposed on a halogenated surface of the sole unit.

Munari, U.S. Pat. No. 3,354,562 describes a vulcanized rubber outsole for shoes such as ski shoes is formed as a hollow box-like unit with a flat bottom tread and upstanding side walls of a height to cover a multilayer shoe sole on its edges. The outsole is glued to the multilayer shoe sole.

Clemens, U.S. Pat. No. 3,733,721 describes the specification discloses a resilient pad, for example, foamed elastomeric material with the pad being generally contoured for mounting on the bottom of an article of footwear, such as a shoe, or the like. The paid is provided with pressure sensitive adhesive on the upper side so that it can be adhered to the bottom of an article of footwear to provide a cushion, while the pad can readily be removed from the articles of footwear when desired.

Goodyear, U.S. Pat. No. 4,317,294 describes a replaceable shoe sole is comprised of a mid-sole, which is securely attached to the upper portion of the shoe, and an out-sole removeably attached to the mid-sole. The upper surface of the out-sole is provided with a continuous ridge which is snapped into a matching, deformably resilient groove recessed into the bottom surface of the mid-sole. The configuration of the ridge and the resiliency of the out-sole and the mid-sole material, which is preferably a polyurethane resin or foam, permits the out-sole to be easily and selectively removed and replaced by an out-sole having a new or distinctive tread pattern, the replaced out-sole being reusable if desired. The ridge on the out-sole is provided with an undercut portion to provide secure retention of the out-sole in the mid-sole, although the specific cross sectional shape of the ridge may vary depending upon the retentiveness required by a particular activity.

Cavanagh, U.S. Pat. No. 4,608,768 describes an athletic shoe having a shock-absorbing running sole which has at least one intermediate support extending at least approximately in parallel with a major plane of the running sole. The intermediate openwork support is disposed in a softly elastic midsole provided between an insole and a running sole. For obtaining a targeted reduction of shock stresses occurring to a varying degree in the individual sole sections, plugs are inserted into the openwork support. The plugs are made of a material that is harder than that of the midsole and are disposed vertically with respect to the noted major plane thereof, at least in the sections that are highly or maximally stressed during the running and possibly also in the adjacent zones.

The prior art teaches that new soles can be attached to worn out shoes. However, the prior art does not teach an adhesive patch which is thin and flexible enough to adhere to the bottoms of worn out sneakers and mold to the contours of the tread of the sneaker, provide a non-slip surface which is suitable for the bottoms of sneakers, and yet also provide a tough enough surface to prolonging the life of the sneaker without the expense of replacing the entire sole of the shoe. The prior art also does not provide an adhesive patch which has a slip-proof and scuff-resistant exterior. The present invention fulfills these needs and provides further related advantages as described in the following summary.

SUMMARY OF THE INVENTION

The present invention teaches certain benefits in construction and use which give rise to the objectives described below.

The present invention provides a shoe repair composite material having a cloth layer bonded to the bottom of a shoe with a bonding adhesive layer. The cloth layer has a thickness of approximately 0.020 inches and is impregnated with a contact cement sold under the trademark DAP WELD-WOOD™. The bonding adhesive layer is made of double sided specialty coated tape sold under the trademark TESAFIX™, type 4964 Textile Fixing and Splicing Tape, having a thickness of approximately 0.020 inches. These two layers are bonded together and then covered with peel-removable paper to protect the contact cement and the bonding adhesive. In an alternative embodiment, the cloth layer is covered with a vinyl layer having a thickness of approximately 0.020 inches to provide a tough, inelastic and scuff-resistant outer layer. This vinyl layer provides a plurality of approximately 700 embossed protrusions per square inch to provide scuff-resistance and increased traction.

A primary objective of the present invention is to provide a shoe repair composite material which is thin enough to mold itself to the grooves and contours on the bottom of a worn out sneaker to provide a patch to repair sneakers, the patch having advantages not taught by the prior art.

Another objective is to provide a durable patch which can be applied directly onto the soles of worn-out sneakers without the need to apply any additional adhesives and which will not rip off or tear under the stresses normally applied to the soles of sneakers.

A further objective is to provide a patch which is simple and inexpensive to manufacture and easy to use.

An objective of the alternative embodiment is to provide a patch which provides a tough, inelastic, scuff-resistant and non-slip surface so the patch does not interfere with the ordinary use of the sneakers.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings:

FIG. 3 is a cross-sectional elevational view of the invention with a fragmented view of a shoe, shown out of true proportion to illustrate the different layers and the embossed protrusions, showing how the invention will mold to the bottom of the shoe and contact the floor.

DETAILED DESCRIPTION OF THE INVENTION

Figure 1:
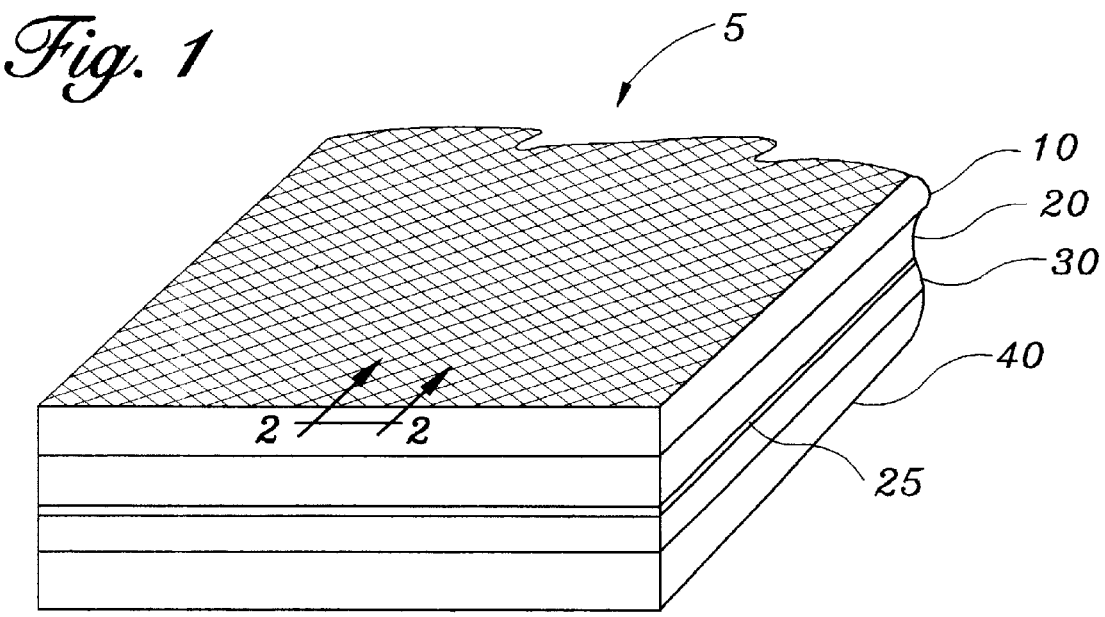
FIG. 1 is a perspective view of the preferred embodiment of the present invention in which a first layer is a vinyl sheet having an embossed pattern; and one corner of the composite material is shown with the different layers peeled apart for purposes of illustration.

The above described drawing figures illustrate the invention, a shoe repair composite material 5 having a cloth layer 20 bonded to the bottom of a shoe (not shown) with a bonding adhesive layer 30. In the preferred embodiment, the cloth layer 20 has a thickness of approximately 0.010–0.032, preferably 0.020 inches, and is impregnated with a contact cement (not shown) sold under the trademark DAP WELD-WOOD™. The contact cement in the cloth layer 20 provides a durable and wear resistant surface which also provides good traction. The bonding adhesive layer 30 is made of double sided specialty coated tape sold under the trademark TESAFIX™, type 4964 Textile Fixing and Splicing Tape, having a thickness of approximately 0.010–0.032, preferably 0.020 inches. The bonding adhesive layer 30 can form strong bonds both with the underside of the shoe (not shown) and the cloth layer 20. These two layers 20 and 30 are bonded together and then covered with a first and second layers of peel-removable paper 10 and 40 to protect the contact cement and the bonding adhesive, respectively. The first and second layers of peel-removable paper 10 and 40 preferably have a lift tab 41 which extends beyond the layers 20 and 30 to facilitate lifting and removing the first and second layers of peel-removable paper 10 and 40. Further details about these materials and how they are used is provided below.

In an alternative embodiment, the cloth layer 20 is covered with a first layer 10, a vinyl layer 10, rather than peel-removable paper, to provide a tougher, inelastic, and scuff-resistant outer layer to the invention. This vinyl layer 10 has a thickness of approximately 0.010–0.032, preferably 0.020 inches. The alternative embodiment of the invention preferably has a first layer 10, a second layer 20 impregnated with contact cement (not shown), a third layer 30, and a layer of peel-removable paper 40, all bonded together with a bonding adhesive (not shown).

The first layer 10 is made of a flexible, inelastic plastic sheet material, preferably vinyl, having a thickness of approximately 0.010–0.032, preferably approximately 0.020 inches.

Figure 2:
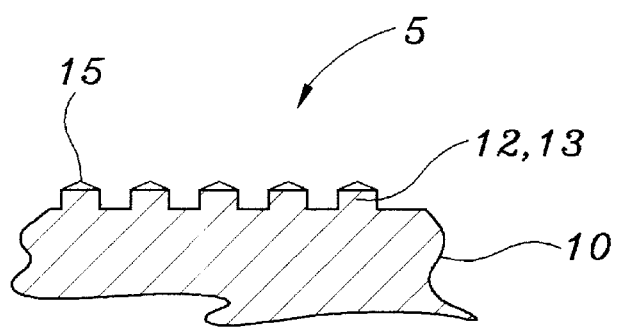
FIG. 2 is a magnified partial sectional view taken along cutting line 2—2 in FIG. 1 to more fully define an embossed surface of the invention.

While the first layer 10 is flexible enough to mold to the bottom of a sneaker (not shown), it is very tough and it is also inelastic, thus providing lateral support to the composite material 5. This provides an excellent and wear resistant material for the rugged uses to which sneakers are subjected. The first layer 10 has an obverse side 14 and a reverse side 16. The obverse side 14 of the first layer 10 has an embossed pattern 12. The embossed pattern 12, as shown in FIG. 2, is preferably a plurality of embossed protrusions 13 with pointed ends 15, most preferably approximately 700 embossed protrusions 13 per square inch. The embossed protrusions 13 extend outwardly from the obverse side 14 by between approximately 0.002 and 0.005 inches. The embossed protrusions 13 provide a scuff resistant low friction surface when light pressure is used to press the obverse side 14 against the floor (not shown). However, when higher pressure is used to press the obverse side 14 against the floor (not shown), the embossed protrusions 13 gain traction by digging into small cracks and irregularities (not shown) in the floor (not shown). This traction provides higher friction when you apply greater pressure on the floor (not shown).

The second layer 20 has a top side 22 and a bottom side 24, and is made of a flexible woven fabric material 20, preferably cotton or nylon, having a thickness of approximately 0.010–0.032, preferably approximately 0.020 inches. The second layer 20 is preferably a flexible woven fabric material having approximately 32 stitches (not shown) per linear inch. The stitches (not shown) must be an open weave to accept the bonding agent (not shown). The top side 22 of the second layer 20 is bonded to the reverse side 16 of the first layer 10 by a bonding agent. The flexibility of the flexible woven fabric material 20 allows it to mold closely to the sole of the shoe (not shown), while the open weave allows the bonding agent to thoroughly permeate the flexible woven fabric material 20 and form a stable bond. Both the first and second layers 10 and 20 can be purchased already bonded together in the form of cloth and vinyl tops used on convertible cars.

The third layer 30 is a flexible fabric covered with contact bonding adhesive (not shown) having a thickness of approximately 0.010–0.032, preferably approximately 0.020 inches.

The third layer 30 is preferably a specialty coated tape such as a rubber adhesive cloth tape used in splicing heavy cloth or carpet. Most preferably, the third layer 30 is 15 mils thick rubber adhesive tape sold by Tessa Tapes, Inc. under the trademark TESAFIX™, type 4964 Textile Fixing and Splicing Tape, which includes natural rubber, clay, and hydrocarbon resins. The third layer 30 has a first side 32 and a second side 34.

The invention also includes a special contact cement (not shown) which is critical to the invention. The first side 32 of the third layer 30 is joined to the bottom side 24 of the second layer 20 by the contact cement (not shown) in addition to the bonding agent (not shown). The contact cement (not shown) preferably has a neoprene synthetic rubber base having 18% solids, a viscosity of approximately 160–200 cps, 6.6 lbs/gal, and a flash point of less than −20 degrees Fahrenheit, which contains the following ingredients: Petroleum Naphtha 64742-89-8, Acetone 67-64-1, Toluene 108-88-3, Hexane 110-54-3, TSRN 618608-5001p. Most preferably, the contact cement (not shown) is the material sold under the trademark DAP WELDWOOD™, sold by Landau H. H. R. The combination of the bonding agent (not shown) on the third layer 30 and the contact cement (not shown) forms an unusually strong bond due to cross-linking reactions between the bonding agent (not shown) and the contact cement (not shown). This contact cement (not shown) is a critical aspect of the invention and is necessary in all embodiment of the invention because the contact cement (not shown) not only forms the extremely strong bond which is necessary to holding the composite together under the great stresses of use, it also causes the layer two 20 to harden in use and become markedly more wear resistant. It is important the contact cement (not shown) be applied in multiple layers to both the first side 32 of the third layer 30 and the bottom side 24 of the second layer until thoroughly and thickly coated. It is possible to tell when the cement is coated thick enough because the surfaces of the first side 32 and the bottom side 24 turn yellow, the color of the DAP WELDWOOD™ contact cement (not shown). Each layer must be allowed to dry between coatings until a final layer is applied and the first side 32 and the bottom side 24 are put together while the contact cement (not shown) is still wet, forming the bond. The DAP WELDWOOD™ contact cement (not shown) is well suited to being applied in multiple layers as described. The second side 34 of the third layer 30 is then covered by a sheet of peel-removable paper 40.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A shoe repair composite material comprising:
    a cloth layer of a flexible woven fabric material having a having a thickness of approximately 0.010–0.032 inches, the cloth layer being impregnated with contact cement; and
    a bonding adhesive layer of a flexible fabric covered with contact bonding adhesive having a thickness of approximately 0.010–0.032 inches;
    the cloth layer bonded to the bonding adhesive layer by a combination of the bonding adhesive and the contact cement.

2. The shoe repair composite material of claim 1 further comprising:
    a first layer of peel-removable paper bonded to a top side of the cloth layer; and
    a second layer of peel-removable paper bonded to a second side of the bonding adhesive layer;
    the layers of peel-removable paper preserving the contact cement and the contact adhesive until ready for use.

3. A shoe repair composite material comprising:
    a first layer of peel-removable paper having a reverse side;
    a second layer of a flexible woven fabric material having a top side, a bottom side and having a thickness of approximately 0.010–0.032 inches, the second layer being impregnated with contact cement, the top side being bonded to the reverse side of the peel-removable paper by the contact cement;
    a third layer of a flexible fabric impregnated with contact bonding adhesive, the third layer having a first side, a second side, and a thickness of approximately 0.010–0.032 inches, the first side of the third layer being joined to the bottom side of the second layer by a combination of the bonding adhesive and the contact cement, and
    a fourth layer of peel-removable paper attached to a reverse side of the third layer.

4. A shoe repair composite material comprising:
    a first layer of a flexible plastic sheet material having a thickness of approximately 0.010–0.032 inches, the first layer being inelastic and providing an embossed pattern on an obverse side thereof, the pattern having a plurality of embossed protrusions;
    a second layer of a flexible woven fabric material having a top side, a bottom side, and a thickness of approximately 0.010–0.032 inches, the top side of the second layer being bonded to a reverse side of the first layer by a bonding agent;
    a third layer of a flexible fabric covered with contact bonding adhesive having a thickness of approximately 0.010–0.032 inches, a first side of the third layer joined to the bottom side of the second layer by a contact cement, a second side of the third layer being covered by a sheet of peel-removable paper.

5. The shoe repair composite material of claim 4 wherein the pattern on the obverse side of the first layer has approximately 700 embossed protrusions per square inch.

6. The shoe repair composite material of claim 5 wherein the embossed protrusions extend outwardly from the obverse side by between approximately 0.002 and 0.005 inches.

7. The shoe repair composite material of claim 4 wherein the second layer is a flexible woven fabric which has approximately 32 stitches per linear inch.

* * * * *